United States Patent
Hessling-von Heimendahl

(10) Patent No.: US 12,435,857 B2
(45) Date of Patent: Oct. 7, 2025

(54) EXTERIOR AIRCRAFT LIGHT, AIRCRAFT COMPRISING AN EXTERIOR AIRCRAFT LIGHT AND METHOD OF DRAINING A FLUID OUT OF AN EXTERIOR AIRCRAFT LIGHT

(71) Applicant: Goodrich Lighting Systems GmbH & Co. KG, Lippstadt (DE)

(72) Inventor: André Hessling-von Heimendahl, Koblenz (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 1 day.

(21) Appl. No.: 18/652,590

(22) Filed: May 1, 2024

(65) Prior Publication Data

US 2024/0377055 A1 Nov. 14, 2024

(30) Foreign Application Priority Data

May 11, 2023 (EP) ..................................... 23172843

(51) Int. Cl.
  *F21S 45/30* (2018.01)
  *B64D 47/02* (2006.01)
  *F21W 107/30* (2018.01)

(52) U.S. Cl.
  CPC .............. *F21S 45/30* (2018.01); *B64D 47/02* (2013.01); *F21W 2107/30* (2018.01)

(58) Field of Classification Search
  CPC ........ B64D 47/02; B64D 47/04; B64D 47/06; F21W 2107/30; F16K 15/04;
  (Continued)

(56) References Cited

U.S. PATENT DOCUMENTS 1,270,961 A * 7/1918 Lippert ............... F04B 39/1033
  251/284
1,594,168 A * 7/1926 Goff ..................... F16K 15/042
  91/464

(Continued)

FOREIGN PATENT DOCUMENTS

CN  203304110 U  * 11/2013
CN  215673701 U  *  1/2022

(Continued)

OTHER PUBLICATIONS

European Patent Office; European Search Report dated Oct. 9, 2023 in Application No. 23172843.7.

*Primary Examiner* — Alexander K Garlen
(74) *Attorney, Agent, or Firm* — SNELL & WILMER L.L.P.

(57) ABSTRACT

An exterior aircraft light comprises a housing defining an interior space; a light output generation unit comprising at least one light source; power supply electronics, coupled to the light output generation unit for driving a light out-put of the exterior aircraft light; and a draining device for draining the interior space. The draining device comprises a first drainage tube for receiving fluid, which is to be drained from the interior space; a second drain-age tube for receiving fluid, which is to be drained from the interior space; and a fluid discharge port for discharging fluid out of the housing, wherein the fluid discharge port is in fluid communication with the first drainage tube and with the second drainage tube. Each of the first drainage tube and the second drainage tube comprises a valve mechanism for selectively sealing and opening the respective drainage tube with respect to the interior space.

15 Claims, 5 Drawing Sheets

(58) Field of Classification Search
CPC ...... F16K 15/042; F16K 15/044; F21S 45/30; F21S 45/33; F21S 45/37; F21V 31/03
See application file for complete search history.

(56) References Cited

U.S. PATENT DOCUMENTS

| | | | | |
|---|---|---|---|---|
| 4,409,959 | A | * | 10/1983 | Sigworth, Jr. .......... F16K 15/04 165/300 |
| 5,251,111 | A | * | 10/1993 | Nagengast .............. F21S 45/33 362/547 |
| 6,085,769 | A | | 7/2000 | Poyner et al. |
| 6,131,605 | A | * | 10/2000 | Kothe .................. B65D 88/747 137/433 |
| 2005/0157514 | A1 | * | 7/2005 | Brinkmann ............. F21S 45/33 362/547 |
| 2011/0255293 | A1 | * | 10/2011 | Lipscomb ............... F21V 31/03 362/362 |
| 2014/0043844 | A1 | * | 2/2014 | Yang ...................... F21S 45/33 362/547 |
| 2017/0067663 | A1 | | 3/2017 | Barna |
| 2023/0194067 | A1 | * | 6/2023 | Krishna ................ F16K 31/084 362/547 |

FOREIGN PATENT DOCUMENTS

| | | | | |
|---|---|---|---|---|
| EP | 3403934 | | 1/2021 | |
| EP | 3626629 | | 7/2021 | |
| EP | 3851742 | | 7/2021 | |
| JP | 2002513504 | A * | 5/2002 | ............. F21S 45/37 |
| WO | 2011154339 | | 12/2011 | |

* cited by examiner

EXTERIOR AIRCRAFT LIGHT, AIRCRAFT COMPRISING AN EXTERIOR AIRCRAFT LIGHT AND METHOD OF DRAINING A FLUID OUT OF AN EXTERIOR AIRCRAFT LIGHT

CROSS-REFERENCE TO RELATED APPLICATIONS

This application claims priority to and the benefit of EP Patent Application No. 23172843.7, filed May 11, 2023 and titled "EXTERIOR AIRCRAFT LIGHT, AIRCRAFT COMPRISING AN EXTERIOR AIRCRAFT LIGHT AND METHOD OF DRAINING A FLUID OUT OF AN EXTERIOR AIRCRAFT LIGHT," which is incorporated by reference herein in its entirety for all purposes.

FIELD

The present invention relates to aircraft lighting. In particular, the present invention relates to an exterior aircraft light. The present invention further relates to an aircraft comprising such an exterior aircraft light and to a method of draining a fluid out of an exterior aircraft light.

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior aircraft lights are navigation lights, also referred to as position lights, red-flashing beacon lights, white strobe anti-collision lights, wing scan lights, take-off lights, landing lights, taxi lights, runway turn-off lights, etc.

An exterior aircraft light may comprise a housing for accommodating electrical and/or optical components. In operation, fluid, for example condensing water, may collect within the housing. Said water may deteriorate the operation of the exterior aircraft light.

It would therefore be beneficial to provide an exterior aircraft light with a highly effective draining device for draining fluid out of the housing of the exterior aircraft light.

SUMMARY

Exemplary embodiments of the invention include an exterior aircraft light that comprises: a housing defining an interior space; a light output generation unit comprising at least one light source; and power supply electronics, coupled to the light output generation unit for driving a light output of the exterior aircraft light. At least one of the light output generation unit and the power supply electronics is arranged within the interior space, defined by the housing. The exterior aircraft light further comprises a draining device for draining fluid out of the interior space.

The draining device comprises: a first drainage tube for receiving fluid, which is to be drained from the interior space; a second drainage tube for receiving fluid, which is to be drained from the interior space; and a fluid discharge port for discharging fluid out of the housing, with the fluid discharge port being in fluid communication with the first drainage tube and the second drainage tube. The fluid discharge port of the draining device provides a fluid connection between the interior space of the housing and the environment outside of the housing for discharging the fluid out of the interior space.

Although the first and second drainage tubes are both configured/arranged for receiving fluid, it is to be noted that the first and second drainage tubes are not configured/arranged for receiving the fluid simultaneously. Instead, depending on the spatial orientation of the exterior aircraft light, only one of the first and second drainage tubes will receive fluid. This will be explained in more detail below.

Each of the first drainage tube and the second drainage tube comprises a valve mechanism for selectively sealing and unsealing/opening the respective drainage tube with respect to the interior space. Each valve mechanism includes a valve portion of the respective drainage tube and a sealing element, in particular a sealing ball, which is arranged in the valve portion of the respective drainage tube. The valve portion is made of a first material and the sealing element is made of a second material, with the first material and the second material having different water absorption and expansion characteristics. The valve portion and the sealing element are sized to seal the valve mechanism in an air-tight manner, when not immersed in fluid, and to unseal/open the valve mechanism, when it is immersed in fluid, which is to be drained from the interior space.

Exemplary embodiments of the invention also include a method of draining a fluid out of the interior space of the housing of an exterior aircraft light according to an exemplary embodiment of the invention, with the exterior aircraft light being mounted to an aircraft in a first mounting orientation so that a first drainage tube extends into a low portion of the interior space, wherein the method comprises the steps of: with fluid gathered in the low portion of the interior space of the housing, when the aircraft is on the ground, opening the valve mechanism of the first drainage tube via the fluid entering into the valve portion and potentially also the sealing element of the valve mechanism of the first drainage tube; sealing the valve mechanism of the second drainage tube, as no fluid is entering into the valve portion and the sealing element of the valve mechanism of the second drainage tube. Taking off the aircraft and gaining altitude. With a pressure difference, which is built-up between the interior space of the housing and an outside environment of the aircraft with increasing altitude, driving the fluid through the valve mechanism of the first drainage tube and through the fluid discharge port out of the housing.

In a draining device of an exterior aircraft light according to an exemplary embodiment of the invention, the valve mechanism of that drainage tube that is immersed in fluid collected at a low portion of the interior space is unsealed/opened, whereas the valve mechanism of the other drainage tube, which is not immersed in the fluid, is sealed in an air-tight manner.

In case of a pressure difference between the interior space and the fluid discharge port, the sealed valve mechanism, i.e. the valve mechanism of that drainage tube that is not immersed in the fluid, prevents the pressure from equalizing through the drainage tube that is not immersed in the fluid. In consequence, the pressure difference may equalize only through the other drainage tube, i.e. through that drainage tube that is immersed in the fluid. As a result, the pressure difference drives the fluid out of the interior space via that drainage tube that is immersed in the fluid.

The fluid discharge port may in particular be in fluid communication with the exterior of the aircraft. This may cause a decrease of the pressure within the fluid discharge port and the drainage tubes of the draining device, when the aircraft is gaining altitude. Thus, the rise of the aircraft after take-off may generate a pressure difference between the interior space and the fluid discharge port that acts as a driving force for draining the fluid out of the interior space.

The draining device of an exterior aircraft light according to an exemplary embodiment of the invention may effectively and reliably drain fluid, such as condensing water, out of the interior space of the housing of the exterior aircraft light, without the need for providing a mechanical pumping mechanism. The draining device may be an entirely passive draining device. The actuation of the draining device may take place via the pressure conditions present during the flight of the aircraft. The draining device of an exterior aircraft light according to an exemplary embodiment of the invention may comprise only two movable parts. It may therefore be easy to produce and may not need extensive maintenance. The draining device of an exterior aircraft light according to an exemplary embodiment of the invention is very reliable, as it is operable without being connected to a power source.

In an embodiment, the first material has a first extension, which is a first function of the amount of water comprised in the first material, and the second material has a second extension, which is a second function of the amount of water comprised in the second material. The gradient of the first function with respect to the amount of water comprised in the first material may in particular be larger than the gradient of the second function with respect to the amount of water comprised in the second material. In other words, the first material may expand/swell more than the second material, when immersed in water. Such materials may be well suited for providing a reliable valve mechanism, as described above.

In an embodiment, an outer diameter of the cross-section of the sealing element and an inner diameter of the cross-section of the valve portion are set so that the valve mechanism allows water to flow through the valve portion into the respective drainage tube, when the first and second materials are immersed within the fluid, which is to be drained. Further, the outer diameter of the cross-section of the sealing element and the inner diameter of the cross-section of the valve portion may be set so that the valve mechanism seals the respective valve portion in an air-tight manner, when the first and second materials are not immersed within the fluid, which is to be drained. This selective sealing/unsealing behavior may provide a reliable valve mechanism.

In an embodiment, the first drainage tube is arranged for receiving fluid from a first portion of the housing and the second drainage tube is arranged for receiving fluid from a second portion of the housing. This may allow for reliably draining fluid from different portions of the housing, depending on a mounting orientation of the exterior aircraft light.

In an embodiment, the exterior aircraft light is mountable to an aircraft in a first mounting orientation and in a second mounting orientation. The first drainage tube may extend into a first portion of the interior space, with the first portion being a low portion of the interior space, when the exterior aircraft light is in the first mounting orientation. The second drainage tube may extend into a second portion of the interior space, with the second portion being a low portion of the interior space, when the exterior aircraft light is in the second mounting orientation.

Depending on the orientation of the exterior aircraft light, when mounted to the aircraft, the fluid may collect in the first portion or in the second portion of the housing. A draining device that comprises a first drainage tube, which is arranged for receiving fluid from the first portion of the housing, and a second drainage tube, which is arranged for receiving fluid from the second portion of the housing, may allow for draining fluid out of the housing in any of the two potential orientations of the exterior aircraft light. This may allow for mounting the same exterior aircraft light in two different orientations to the aircraft and providing a reliable draining of the exterior aircraft light in any of the two orientations.

In an embodiment, the first and second drainage tubes may be arranged so that one of the first and second drainage tubes is immersed in fluid, collecting at the bottom of the interior space, in either of the possible/intended orientations in which the exterior aircraft light may be mounted to the aircraft. An exterior aircraft light according to an exemplary embodiment of the invention may be drained by the draining device in any one of the possible 7 intended mounting orientations. Thus, the same type of exterior aircraft light may be employed in different mounting positions and orientations. The number of different types of exterior aircraft lights, which are required for equipping an aircraft with a full set of exterior aircraft lights, may be reduced.

In an embodiment, the first drainage tube and the second drainage tube are oriented at an angle of between 15° and 180° with respect to each other. The first drainage tube and the second drainage tube may in particular be arranged at an angle of between 30° and 60° with respect to each other, or at an angle of between 150° and 180° with respect to each other.

First and second drainage tubes that are arranged at an angle of between 30° and 60° with respect to each other are in particular suitable for aircraft headlights, such as take-off lights and landing lights, which may often be arranged in different orientations that differ by an angle of between 30° and 60° with respect to each other.

First and second drainage tubes that are arranged at an angle of between 150° and 180° with respect to each other are in particular suitable for red-flashing beacon lights or navigation lights, which may often be arranged in two different orientations that differ by an angle of between 150° and 180° with respect to each other.

In an embodiment, the draining device may comprise more than two drainage tubes. Such a design may allow for mounting the exterior aircraft light in more than two different orientations to the aircraft. The draining device may comprise, for example, three, four, five, six, seven, eight or even more drainage tubes. Providing more than two drainage tubes may in particular be suitable for aircraft headlights, such as take-off lights and landing lights, which may often be mounted to an aircraft in more than two different orientations. For example, there exist aircraft headlights that are mountable to an aircraft running gear in three orientations, with the three orientations having a center orientation and two angled orientations, which have an angle of +/−45° with respect to the center orientation.

The plurality of drainage tubes may extend from a common central portion of the draining device. The angles between adjacent drainage tubes may be equal or different. The drainage tubes may extend in a common plane. In an alternative embodiment, the drainage tubes may not extend in a common plane. The spatial orientations of the drainage tubes may in particular correspond to the potential mounting orientations of the exterior aircraft light.

In an embodiment, the valve portion comprises a retainer structure for preventing the sealing element from dropping out of the valve portion of the respective drainage tube, when the valve mechanism is immersed in fluid, which is to be drained from the interior space.

In an embodiment, the retainer structure comprises at least one protrusion, extending radially from a wall of the respective drainage tube into the interior of the respective drainage tube.

In an embodiment, the valve mechanism is arranged at an end portion of the respective drainage tube. A valve mechanism that is arranged at an end portion of the respective drainage tube is reliably immersed in fluid, even when only a small quantity of fluid collects at a bottom portion/low portion of the housing.

In an embodiment, each of the first drainage tube and the second drainage tube has an opening, respectively. Said opening may be arranged in close proximity to a respective wall portion of a surrounding wall structure defining the interior space. The distance between the opening and the respective wall portion may be set to prevent the sealing element from dropping out of the valve portion, when the valve portion is immersed in the fluid. The opening may in particular be spaced from the respective wall portion by a distance of between 0.5 mm and 5 mm, more in particular by between 1 mm and 2.5 mm. The opening of the drainage tube may also be referred to as the front opening/the mouth of the drainage tube.

In an embodiment, each of the first drainage tube and the second drainage tube, when not immersed in fluid, has a cross-section with an inner diameter in the range of between 5 mm and 15 mm, in particular an inner diameter in the range of between 8 mm and 12 mm, more particularly an inner diameter of about 10 mm. Cross-sections having diameters in these ranges have been found as well suited for providing the fluid transport capacity that is desired for draining the fluid, collected at the bottom portion of the housing, out of the housing.

In an embodiment, the sealing element has a cross-section with an outer diameter that is between 0.03 mm and 0.08 mm larger, in particular about 0.05 mm larger, than an inner diameter of a cross-section of the valve portion, when the first and second materials are not immersed in fluid. A press fit between the sealing element and the valve portion may be provided. This may provide for a particularly reliable sealing of the valve mechanism in an air-tight manner, when it is not immersed in the fluid.

In an embodiment, the sealing element has a cross-section with an outer diameter that is between 0.1 mm and 0.5 mm smaller, in particular about 0.3 mm smaller, than an inner diameter of the cross-section of the valve portion, when the first and second materials are immersed in fluid. The press fit between the sealing element and the valve portion may be loosened in response to the different water absorption and expansion characteristics of the first and second materials. The smaller cross-section of the outer diameter of the sealing element provides for a gap between the sealing element and the valve portion that is sufficiently large for draining the fluid out of the housing, when the valve mechanism is immersed in the fluid collected at the bottom portion of the interior space.

In an embodiment, the first material includes at least one of PA6, PA 6.6, PA 66 and PA 46 and/or the second material includes at least one of PMMA, PEEK, PTFE and steel. These materials have been found to have water absorption and expansion characteristics that are well suited for providing the desired functionality of the valve mechanisms. In addition, PMMA, PEEK, and PTFE have similar coefficients of thermal extension as PA6, PA 6.6, PA 66 and PA 46. Material combinations of PMMA/PEEK/PTFE on the one hand and PA6/PA 6.6/PA 66/PA 46 on the other hand may be particularly reliable over wide temperature ranges, because the similar coefficients of thermal expansion may help to prevent undesired openings/closings of the valve mechanisms in large temperature swings. Material combinations of PEEK/PTFE on the one hand and PA6/PA 6.6/PA 66/PA 46 on the other hand may also be particularly robust in environments where hazardous gases and/or fluids, such as exhaust gases/fluids, are a threat to the used materials. Material combinations of PEEK on the one hand and PA6/PA 6.6/PA 66/PA 46 on the other hand may have particularly high longevity, because PEEK has a high creep resistance and may thus provide for a high material integrity over time.

In an embodiment, the fluid discharge port comprises a discharge tube. The discharge tube may in particular be oriented substantially orthogonal to the first drainage tube and/or to the second drainage tube. The discharge tube may be in fluid communication with the outer environment of the aircraft or may be in fluid communication with a conduit or hose that is in turn in fluid communication with the outer environment of the aircraft.

In an embodiment, the light output generation unit and the power supply electronics are both arranged within the housing. Such an embodiment may provide for a compact exterior aircraft light in which many or all important components of the exterior aircraft light are arranged in a single housing.

In an embodiment, the power supply electronics are arranged in the housing and the light output generation unit is arranged in a separate light head portion of the exterior aircraft light, which is arranged outside of the housing. Such an embodiment may provide for an exterior aircraft light in which the light head portion may be positioned and installed independently of the housing. This may provide a high degree of flexibility regarding the installation of the exterior aircraft light.

In an embodiment, the exterior aircraft light is an aircraft headlight, for example an aircraft landing light or an aircraft take-off light or an aircraft taxi light or an aircraft runway turn-off light, or a multi-functional aircraft headlight, which combines the functionalities of any two or any three or all of an aircraft landing light, an aircraft take-off light, an aircraft taxi light, and an aircraft runway turn-off light. An aircraft headlight according to an exemplary embodiment of the invention may be configured such that it can be mounted to an aircraft running gear in at least two different orientations.

In an embodiment, the exterior aircraft light is an aircraft navigation light, in particular a wing-tip-mounted aircraft navigation light. An aircraft navigation light according to an exemplary embodiment of the invention may be configured such that it can be mounted to a left wing tip or to a right wing tip of an aircraft. The orientation of the aircraft navigation light, when mounted to the left wing tip of the aircraft, may be different from the orientation of the aircraft navigation light, when mounted to the right wing tip of the aircraft. In particular, the two mounting orientations may differ by 180°.

In an embodiment, the exterior aircraft is a red-flashing aircraft beacon light, in particular a fuselage-mounted red-flashing aircraft beacon light. A red-flashing aircraft beacon light according to an exemplary embodiment of the invention may be configured such that it can be mounted to a top portion or to a bottom portion of an aircraft fuselage. The two mounting orientations may differ by 180°.

For exterior aircraft lights according to exemplary embodiments of the invention, the same type of exterior aircraft light may be mounted to an aircraft in at least two different orientations. The particular mounting orientation may be chosen depending on the desired position of the exterior aircraft light in the aircraft frame of reference and/or on the particular type of aircraft. As a result, the total number of different exterior aircraft lights that are required for equipping an aircraft/an aircraft fleet with a complete set of exterior aircraft lights may be reduced. In consequence, the efforts and costs for equipping an aircraft/an aircraft fleet with a complete set of exterior aircraft lights may be reduced as well.

Exemplary embodiments of the invention further include an aircraft, such as an airplane or a helicopter, that is equipped with at least one exterior aircraft light according to an exemplary embodiment of the invention. The additional features, modifications and effects, as described above with respect to an exterior aircraft light in accordance with exemplary embodiments of the invention, apply to the aircraft in an analogous manner.

BRIEF DESCRIPTION OF THE DRAWINGS

Further exemplary embodiments of the invention are described below with respect to the accompanying drawings, wherein.

DETAILED DESCRIPTION

Figure 1A:
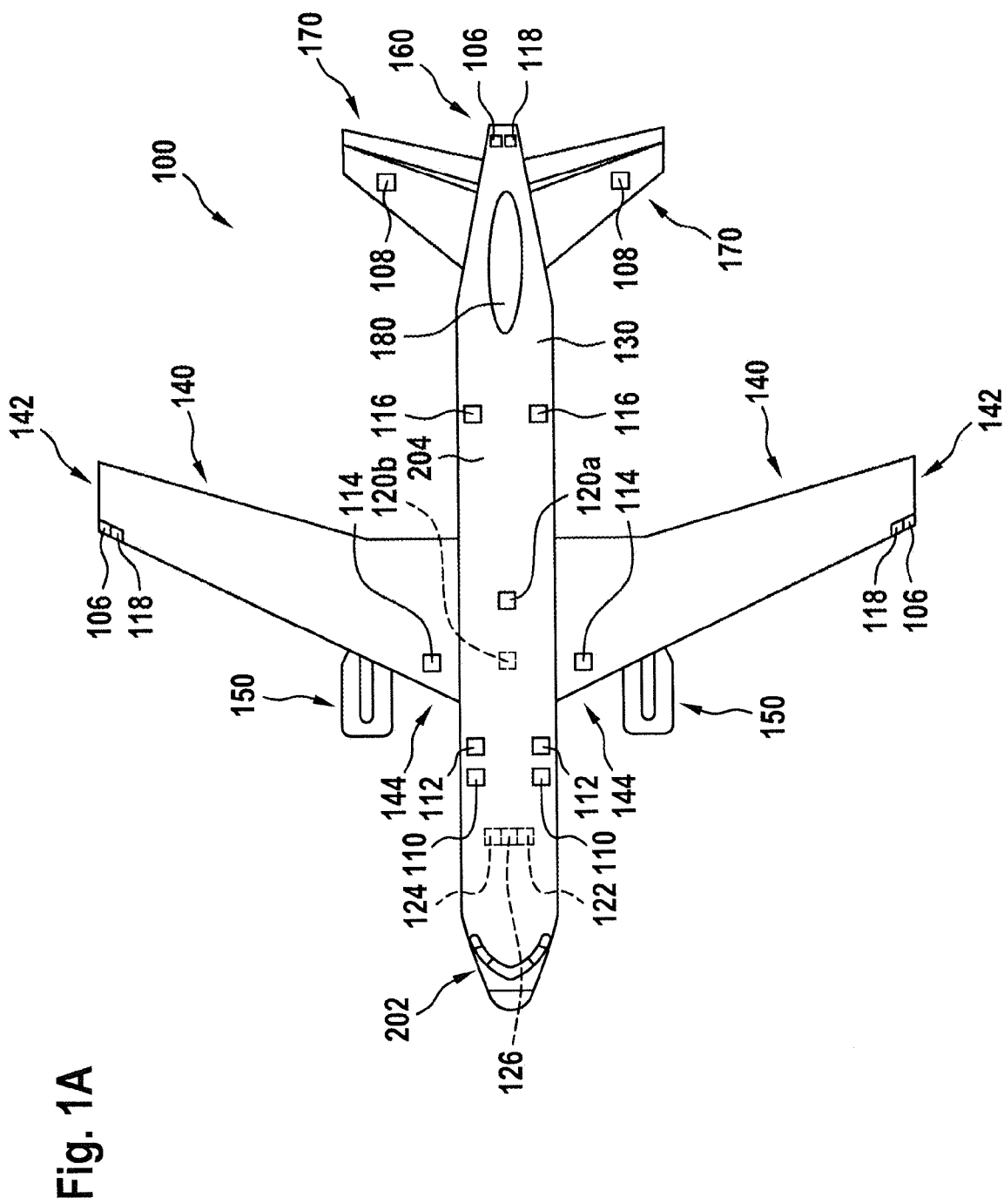
FIG. 1A shows a schematic top view of an aircraft according to an exemplary embodiment of the invention, which is equipped with a variety of exterior aircraft lights.
Figure 1B:
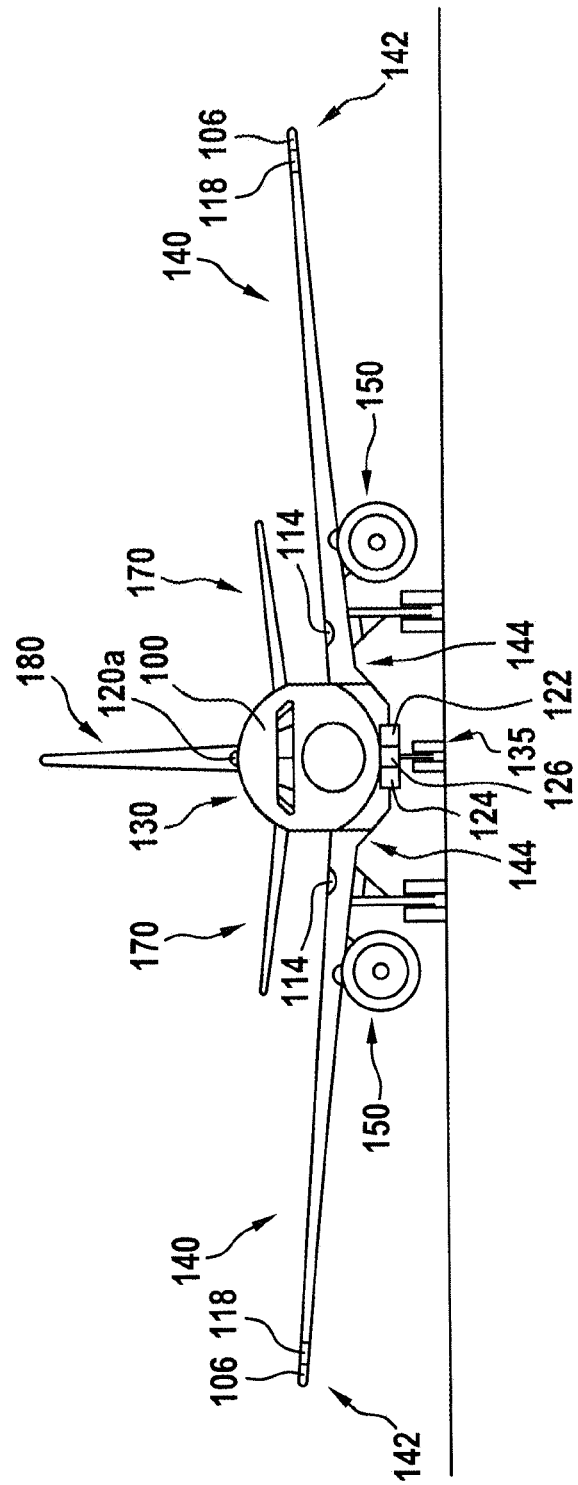
FIG. 1B shows a schematic front view of the aircraft shown in FIG. 1A.

FIGS. 1A and 1B, jointly also referred to as FIG. 1 herein, show an aircraft 100, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 100 is shown in a top view in FIG. 1A and shown in a front view in FIG. 1B.

The aircraft 100 of FIG. 1 is equipped with a wide variety of exterior lights. In particular, the aircraft 100 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120a, 120b, a landing light 122, a take-off light 124 and a taxi light 126. It is pointed out that these kinds of lights and their numbers are exemplary only and that the aircraft 100 may be equipped with additional lights that are not shown.

The three navigation lights 106 are positioned in the left and right wing tips 142 as well as at the tail 160 of the aircraft 100. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 100. The wing scan lights 110 and the engine scan lights 112 are normally off during the flight and may be switched on periodically or upon reasonable cause by the pilots or by the aircrew, in order to check the wings 140 and the engines 150 of the aircraft 100.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 100. They are normally switched off during the flight of the aircraft 100.

The white anti-collision strobe lights 118 are positioned in the left and right wing tips 142 as well as at the tail 160 of the aircraft 100. The white anti-collision strobe lights 118 emit respective sequences of white light flashes during normal operation of the aircraft 100. It is also possible that the white anti-collision strobe lights 118 are only operated during night and in bad weather conditions.

A first red-flashing anti-collision beacon light 120a is positioned on the top of the fuselage 130 of the aircraft 100, and a second red-flashing anti-collision beacon light 120b is positioned at the bottom of the fuselage 130 of the aircraft 100. The second red-flashing anti-collision beacon light 120b, disposed on the bottom of the fuselage 130, is shown in phantom in FIG. 1A.

The first and second red-flashing anti-collision beacon lights 120a, 120b are arranged at the height of the wings in the longitudinal direction of the aircraft 100. The red-flashing anti-collision beacon lights 120a, 120b are normally switched on during taxiing and during take-off and landing. Their output is perceived as a sequence of red light flashes in a given viewing direction.

In the embodiment depicted in FIG. 1, the runway turn-off lights 114 are located in the wings 140, in particular in the roots 144 of the wings 140, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 100.

The aircraft 100 may also comprise one or more multi-functional lights, which combine(s) the functionalities of at least two of a landing light, a take-off light, a taxi light, and a runway turn-off light.

Since the landing light 122, the take-off light 124, and the taxi light 126 are arranged on the bottom of the aircraft 100, they are also depicted in phantom in FIG. 1A.

Each of these exterior aircraft lights may be an exterior aircraft light according to an exemplary embodiment of the invention. In particular, those ones of the depicted exterior aircraft lights where a single type/design of exterior aircraft light may be mounted to the aircraft in different orientations and/or at different mounting positions may largely benefit from the implementation in accordance with exemplary embodiments of the invention. Exemplary embodiments of the invention may for example be provided for the landing light 122, the take-off light 124, the taxi light 126, the runway turn-off lights 114, the navigation lights 106 at the left and right wing tips, and the red-flashing anti-collision beacon lights 120a, 120b. For example, a single type of navigation light that is capable of selectively emitting a green navigation light output or a red navigation light output may be used both as the right wing-tip navigation light and the left wing-tip navigation light. As a further example, a single type of red-flashing beacon light may be used both as the upper red-flashing beacon light and as the lower red-flashing beacon light. When equipped with one or more exterior aircraft lights in accordance with exemplary embodiments of the invention, the aircraft 100 is an aircraft in accordance with an exemplary embodiment of the invention.

At least some of the exterior aircraft lights depicted in FIG. 1 may be mounted in different orientations to the aircraft 100. In other words, the same type of exterior aircraft light may be mounted in at least two different orientations and/or at different positions of the aircraft 100.

Figure 2:
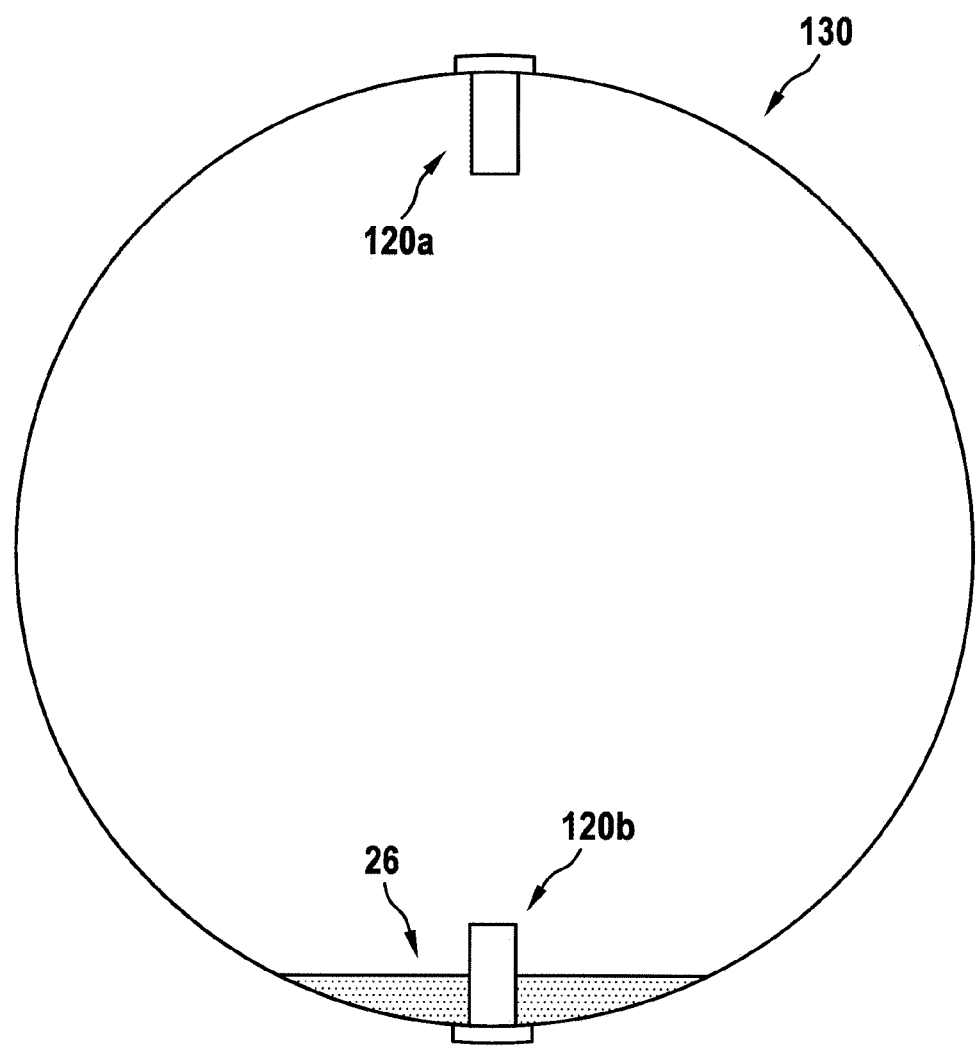
FIG. 2 shows a schematic cross-sectional view of the fuselage of an aircraft that is equipped with two exterior aircraft lights according to exemplary embodiments of the invention.

As an example, FIG. 2 shows a schematic cross-sectional view of the fuselage 130 of an aircraft 100 that is equipped with two red-flashing anti-collision beacon lights 120a, 120b.

A first red-flashing anti-collision beacon light 120a is mounted to a top portion of the fuselage 130, and a second red-flashing anti-collision beacon light 120b is mounted to a bottom portion of the fuselage 130.

The first red-flashing anti-collision beacon light 120a and the second red-flashing anti-collision beacon light 120b may have the same structure/design, i.e. the first red-flashing anti-collision beacon light 120a and the second red-flashing anti-collision beacon light 120b may be identical apart from being mounted to the fuselage 130 of the aircraft 100 in an upside-down orientation with respect to each other.

Fluid 26, which may in particular be condensing water admixed with dirt, may collect at the bottom of the fuselage 130. This fluid may penetrate into the second red-flashing anti-collision beacon light 120b. As mentioned, it is desirable to drain this fluid 26 out of the second red-flashing anti-collision beacon light 120b.

Although two red-flashing anti-collision beacon lights 120a, 120b are shown as an example in FIG. 2, the problem of fluid 26 collecting within the exterior aircraft light may similarly apply to other types of exterior aircraft lights as well.

Such exterior aircraft lights may in particular include aircraft headlights, for example aircraft landing lights and aircraft take-off lights, aircraft taxi lights, an aircraft runway turn-off lights, and multi-functional aircraft headlights, which combine the functionalities of at least two of an aircraft landing light, an aircraft take-off light, an aircraft taxi light, and an aircraft runway turn-off light, as they are depicted in FIG. 1.

Exterior aircraft lights according to exemplary embodiments of the invention may further include aircraft navigation lights, in particular wing-tip-mounted aircraft navigation lights, as they are depicted in FIG. 1.

Figure 3A:
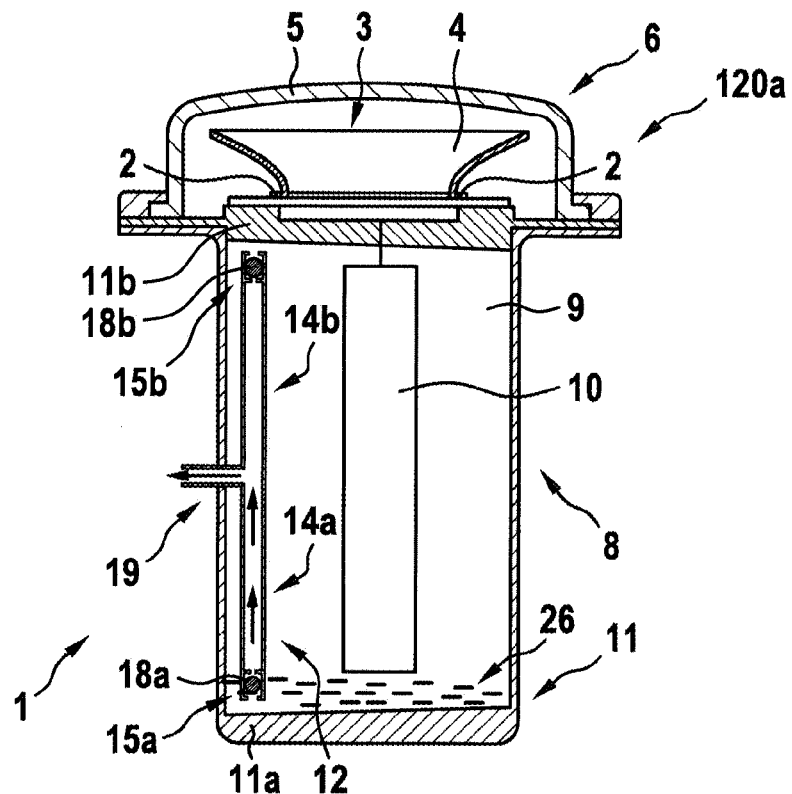
FIG. 3A shows an exterior aircraft light according to an exemplary embodiment of the invention in a first orientation.
Figure 3B:
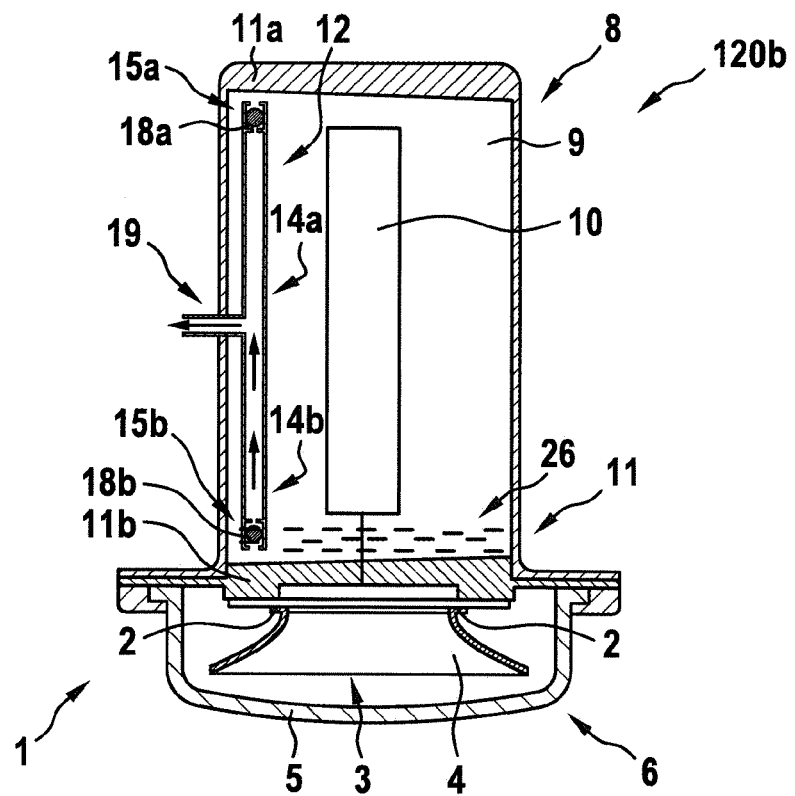
FIG. 3B shows the exterior aircraft light of FIG. 3A in a second orientation.

FIGS. 3A and 3B, jointly also referred to as FIG. 3 herein, show an exterior aircraft light 1 according to an exemplary embodiment of the invention.

FIG. 3A depicts the exterior aircraft light 1 in a first orientation, which may be called an upside orientation, and which may correspond to the exterior aircraft light 1 being mounted to the top of the fuselage 130 of an aircraft 100, as it is depicted for the first red-flashing anti-collision beacon light 120a in FIG. 2.

FIG. 3B depicts the exterior aircraft light 1 in a second orientation, which may be called a downside orientation, and which may correspond to the exterior aircraft light 1 being mounted to the bottom of the fuselage 130 of an aircraft 100, as it is depicted for the second red-flashing anti-collision beacon light 120b in FIG. 2.

In FIG. 3, the red-flashing anti-collision beacon lights 120a, 120b are depicted only as examples. FIG. 3 does not restrict exterior aircraft lights 1 according to exemplary embodiments of the invention to such red-flashing anti-collision beacon lights 120a, 120b. Instead, the principles of draining water out of the exterior aircraft light 1, as described in the following, may similarly apply to other types of exterior aircraft lights 1 as well.

The exterior aircraft light 1 depicted in FIG. 3 comprises a light output generation unit 3 for generating a light output of the exterior aircraft light 1. The light output generation unit 3 comprises at least one light source 2, in particular a plurality of light sources 2, for example LEDs, and at least one optical element 4, in particular a reflector 4, which is shaped for forming the light output of the exterior aircraft light 1 from the light that is emitted by the at least one light source 2.

Although not explicitly shown in FIG. 3, the light output generation unit 3 may comprise at least one further optical element 4, such as a lens, a prism, a shutter, and/or a further reflector 4, in addition to or as an alternative to the reflector 4 depicted in FIG. 3.

The plurality of light sources 2 and the optical element 4 are enclosed by a light transmissive cover 5, which protects the light output generation unit 3 from adverse external influences, and which allows the light emitted by the plurality of light sources 2 to pass through for providing a light output of the exterior aircraft light 1.

The exterior aircraft light 1 further comprises a housing 8 defining an interior space 9 that houses power supply electronics 10. The power supply electronics 10 are electrically coupled to the plurality of light sources 2 of the light output generation unit 3 for driving and controlling the operation of the plurality of light sources 2.

In the embodiment depicted in FIG. 3, the light output generation unit 3 is located in a light head portion 6, which is located outside of the housing 8. In further embodiments, which are not explicitly shown in the figures, the light output generation unit 3 may be located inside the housing 8. In other words, the housing 8 may be a larger housing and may be a joint housing for the light output generation unit 3 and the power supply electronics 10.

As depicted in FIG. 3, fluid 26, which may in particular be condensing water, potentially admixed with dirt, exhaust residues, atmospheric particles, etc., may collect in a low portion 11 of the housing 8. Depending on the orientation, in which the exterior aircraft light 1 is mounted to the aircraft 100, the low portion 11 of the housing 8 may be the side of the housing 8 opposite to the light output generation unit 3, as depicted in FIG. 3A. Alternatively, the low portion 11 of the housing 8 may be the side of the housing 8 next to the light output generation unit 3, as it is depicted in FIG. 3B.

The exterior aircraft light 1 is equipped with a draining device 12 for draining the fluid 26, collected within the respective low portion 11 of the housing 8, irrespective of the orientation in which the exterior aircraft light 1 is mounted to the aircraft 100, i.e. irrespective of whether the exterior aircraft light 1 is mounted to the aircraft 100 in the upside orientation depicted in FIG. 3A, or in the downside orientation depicted in FIG. 3B.

Figure 4:
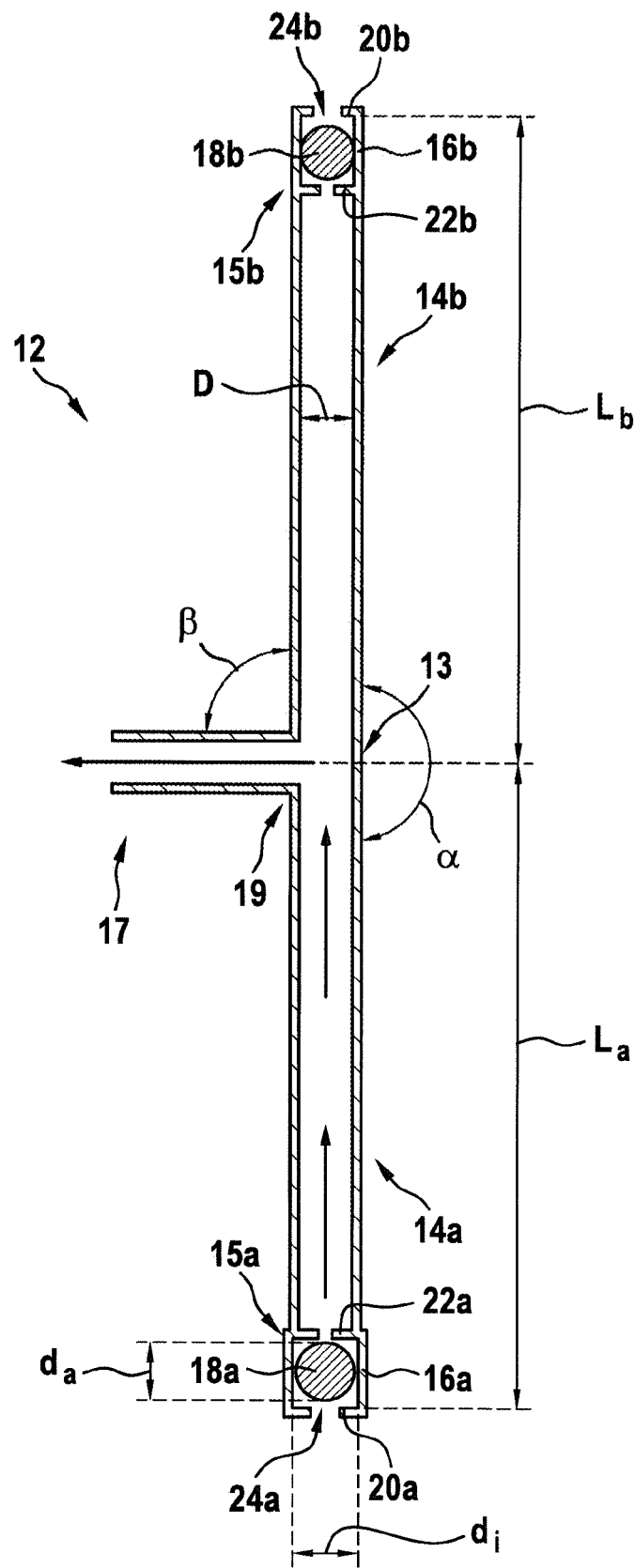
FIG. 4 shows an enlarged schematic cross-sectional view of a draining device that may be used in exterior aircraft lights according to exemplary embodiments of the invention.

FIG. 4 shows an enlarged schematic cross-sectional view of a draining device 12 that may be used in exterior aircraft lights according to exemplary embodiments of the invention.

The draining device 12 comprises a first drainage tube 14a, a second drainage tube 14b, and a fluid discharge port 19 port that is in fluid communication with the first drainage tube 14a and the second drainage tube 14b. The fluid discharge port 19 port is in particular arranged in a central portion of the draining device 12 between the first and second drainage tubes 14a, 14b.

The first and second drainage tubes 14a, 14b are configured for receiving fluid 26, in particular condensing water, which is to be drained from the interior space 9, and for discharging said fluid 26 via the fluid discharge port 19 out of the housing 8.

The fluid discharge port 19 may comprise a discharge tube 17. The discharge tube 17 may in particular be oriented substantially orthogonal to the first drainage tube 14a and/or to the second drainage tube 14b. A conduit or hose, which is not shown in the figures, may be fluidly coupled to the fluid discharge port 19 and/or to the discharge tube 17.

In the exemplary embodiment depicted in FIGS. 3 and 4, the fluid discharge port 19 is provided at a central portion 13 of the draining device 12, and the first and second drainage tubes 14a, 14b extend downwards and upwards from said central portion 13, respectively. The first and second drainage tubes 14a, 14b are in particular oriented at an angle α of 180° with respect to each other. In this way, the first and second drainage tubes 14a, 14b extend along a common straight line.

Each drainage tube 14a, 14b may have a length La, Lb, which is measured from the central portion 13 of the draining device 12 to an outer end of the respective drainage tube 14a, 14b and which is in the range of between 20 mm and 120 mm. The first and second drainage tubes 14a, 14b may have the same or a comparable length. It is also possible that the first and second drainage tubes 14a, 14b have different lengths. The lengths may, inter alia, depend on where a convenient location for the fluid discharge port 19 and/or for the discharge tube 17 is.

The drainage tubes 14a, 14b may have an inner diameter D in the range of between 3 mm and 15 mm, in particular an inner diameter D in the range of between 5 mm and 12 mm, more particularly an inner diameter D of between 6 mm and 10 mm.

FIGS. 3A and 3B illustrate that the first and second drainage tubes 14a, 14b do not simultaneously receive fluid 26 from the interior space 9. Depending on the spatial orientation of the exterior aircraft light 1, only one of the first and second drainage tubes 14a, 14b is immersed in the fluid 26 collected in the low portion 11 of the housing 8, whereas the other one of the first and second drainage tubes 14a, 14b extends into an upper portion of the interior space 9, in which no fluid 26 is present.

The fluid discharge port 19 may be fluidly coupled via a duct, conduit or hose, which is not shown in the figures, to the environment outside the aircraft 100, thereby providing a fluid connection between the interior space 9 and the environment outside of the aircraft 100. Said fluid connection allows the draining device to discharge the fluid 26 out of the interior space 9 into the environment outside the aircraft 100. The discharge tube 17 of the fluid discharge tube 19 may also be in direct fluid communication with the environment outside the aircraft 100.

Each of the first and second drainage tubes 14a, 14b comprises a respective valve mechanism 15a, 15b. In the exemplary embodiment depicted in FIGS. 3 and 4, each valve mechanism 15a, 15b is located at an outer end portion of the respective drainage tube 14a, 14b, i.e. at an end portion of the respective drainage tube 14a, 14b distal from the central portion 13 of the draining device 12.

Each valve mechanism 15a, 15b comprises a respective valve portion 16a, 16b and a respective sealing element 18a, 18b, for example a sealing ball, which is arranged in the valve portion 16a, 16b of the respective drainage tube 14a, 14b. The valve portions 16a, 16b are sections of the drainage tubes 14a, 14b.

The valve portions 16a, 16b are made of a first material, and the sealing elements 18a, 18b are made of a second material that differs from the first material.

The drainage tubes 14a, 14b and the valve portions 16a, 16b may be formed homogeneously. In other words, the valve portions 16a, 16b and the drainage tubes 14a, 14b may be formed integrally from the same first material. Alternatively, those portions of the drainage tubes 14a, 14b that are different from the valve portions 16a, 16b may be made from another material than the valve portions 16a, 16b.

The first and second materials have different water absorption and expansion characteristics. Because the first and second materials have different water absorption and expansion characteristics, the first and second materials expand differently in response to absorbing water.

The first material may in particular have a first extension, which is a first function of the amount of water comprised in the first material, and the second material may have a second extension, which is a second function of the amount of water comprised in the second material.

The gradient of the first function with respect to the amount of water comprised in the first material may be larger than the gradient of the second function with respect to the amount of water comprised in the second material. In consequence, the outer dimensions of the first material will expand to a larger extent than the outer dimensions of the second material, when the first and second materials are immersed in a fluid comprising water.

The first material may, for example, include at least one of PA 46 and PA 66; and the second material may include, for example, at least one of PMMA, PEEK, PTFE and steel.

The dimensions of the valve portions 16a, 16b and of the sealing elements 18a, 18b are set so that each of the valve mechanisms 15a, 15b, when it is immersed in the fluid 26, is open, allowing the fluid 26 to pass therethrough, and so that each of the valve mechanisms 15a, 15b is sealed in an air-tight manner, when it is not immersed in the fluid 26.

More specifically, an outer diameter da of each of the sealing elements 18a, 18b and an inner diameter di of each of the valve portions 16a, 16b may be set so that the respective valve mechanism 15a, 15b allows water to flow through the respective valve portion 16a, 16b into the respective drainage tube 14a, 14b, when the inner diameter di of the respective valve portion 16a, 16b is enlarged, as is the case when the respective valve mechanism 15a, 15b is immersed within the fluid 26, which is to be drained.

Further, the outer diameter da of each of the sealing elements 18a, 18b and the inner diameter di of each of the valve portions 16a, 16b may be set so that the respective valve mechanism 15a, 15b seals the respective valve portion 16a, 16b in an air-tight manner, when the inner diameter di of the respective valve portion 16a, 16b is reduced, as is the case when the respective valve mechanism 15a, 15b is not immersed within the fluid 26.

When not immersed within the fluid 26, the cross-sections of each of the valve portions 16a, 16b may have an inner diameter di in the range of between 5 mm and 15 mm, in particular an inner diameter di in the range of between 8 mm and 12 mm, more particularly an inner diameter di of about 10 mm.

When the valve portions 16a, 16b are not immersed in the fluid 26, the sealing elements 18a, 18b may have an outer diameter da that is between 0.03 mm and 0.08 mm larger, in particular about 0.05 mm larger, than an inner diameter di of the cross-section of the corresponding valve portion 16a, 16b, so that the respective sealing element 18a, 18b seals the corresponding valve portion 16a, 16b in an air-tight manner.

When the valve portions 16a, 16b are immersed in the fluid 26, the sealing elements 18a, 18b may have an outer diameter da that is between 0.1 mm and 0.5 mm smaller, in particular about 0.3 mm smaller, than an inner diameter di of the cross-section of the valve portion 16a, 16b, thereby allowing fluid 26 to flow through a gap formed between the respective sealing element 18a, 18b and the corresponding valve portion 16a, 16b.

Each of the first drainage tube 14a and the second drainage tube 14b has an opening 24a, 24b for receiving the fluid 26. At least one of the openings 24a, 24b may in particular be formed as a front opening 24a, 24b in a front side of the respective drainage tube 14a, 14b.

In the embodiments depicted in FIGS. 3 and 4, a respective front opening 24a, 24b is formed in the first drainage tube 14a and in the second drainage tube 14b. Said front openings 24a, 24b are in particular arranged in close proximity to a respective wall portion 11a, 11b of a surrounding wall structure defining the interior space 9.

Each front opening 24a, 24b may be spaced from the respective wall portion by between 0.5 mm and 5 mm, in particular by between 1 mm and 2.5 mm. In this way, a gap of between 0.5 mm and 5 mm, in particular of between 1 mm and 2.5 mm, may be formed between the respective wall portion and the front opening 24a, 24b.

The gap formed between the front sides of the front openings 24a, 24b and the facing wall portions 11a, 11b may be small enough to prevent the sealing elements 18a, 18b from falling out of the valve portion 16a, 16b, when the valve portion 16a, 16b is immersed in the fluid 26.

Alternatively or additionally, at least one of the valve portions 16a, 16b may comprise an outer retainer structure 20a, 20b for preventing the sealing element 18a, 18b from dropping out of the valve portion 16a, 16b, when the valve portion 16a, 16b is immersed in the fluid 26.

Optionally, each of the front openings 24a, 24b may further be provided with an inner retainer structure 22a, 22b for preventing the sealing elements 18a, 18b from dropping into the respective drainage tube 14a, 14b.

The outer and inner retainer structures 20a, 20b, 22a, 22b may, for example, include protrusions extending radially from the wall of the respective drainage tube 14a, 14b into the interior of the respective drainage tube 14a, 14b.

In the following, the operation of a draining device 12 according to an exemplary embodiment of the invention is described:

When the aircraft 100, to which an exterior aircraft light 1 according to an exemplary embodiment of the invention is mounted, rises into the air and gains altitude, the air pressure outside the aircraft 100 decreases with increasing height of the aircraft 100. This results in an increasing pressure difference between the higher pressure within the interior space 9 and the decreasing pressure outside the aircraft 100.

Due to the above mentioned different water absorption and expansion characteristics of the first and second materials and the carefully selected sizes of the valve portions 16a, 16b and the sealing elements 18a, 18b, the one of the valve mechanisms 15a, 15b that is immersed within the fluid 26, collected within the current low portion 11 of the housing 8, is open, allowing the fluid 26 to pass through, whereas the other valve mechanism 15a, 15b, which is not immersed within the fluid 26, is sealed in an air-tight manner.

More specifically, in the orientation depicted in FIG. 3A, the first valve mechanism 15a, facing downwards and away from the light output generation unit 3, is open, and the second valve mechanism 15b, facing upwards and towards the light output generation unit 3, is sealed in an air-tight manner.

In the orientation depicted in FIG. 3B, the second valve mechanism 15b, facing downwards and towards the light output generation unit 3, is open, and the first valve mechanism 15a, facing upwards and away from the light output generation unit 3, is sealed in an air-tight manner.

Since the one of the valve mechanisms 15a, 15b that is not immersed in the fluid 26 is sealed in an air-tight manner, the pressure difference between the interior space 9 and the environment of the aircraft 100 may equalize only via the lower valve mechanism 15a, 15b that is immersed within the fluid 26.

In consequence, the pressure difference between the interior space 9 and the environment of the aircraft 100 drives the fluid 26, collected at the low portion 11 of the interior space 9, into the respective lower drainage tube 14a, 14b and via the fluid discharge port 19 out of the aircraft 100. As a result, the interior space 9, formed within the housing 8, is drained, with said draining being driven by the pressure difference between the interior space 9 and the environment of the aircraft 100.

Sealing the upper drainage tube 14a, 14b, i.e. the drainage tube 14a, 14b that is not immersed in the fluid 26, in an air-tight manner prevents the pressure difference from equalizing through the upper drainage tube 14a, 14b, without driving the fluid 26, collected at the low portion 11 of the interior space 9, out of the interior space 9.

An exterior aircraft light according to an exemplary embodiment of the present invention ensures that, independently of the orientation in which the exterior aircraft light 1 is mounted to the aircraft 100, the valve mechanism 15a, 15b of the upper drainage tube 14a, 14b, which is not immersed in the fluid 26, is sealed in an air-tight manner, and the valve mechanism 15a, 15b of the lower drainage tube 14a, 14b is open, allowing the fluid 26 to pass therethrough, when it is immersed within fluid 26 collected in a low portion 11 of the housing 8.

In consequence, a draining device 12 of an exterior aircraft light according to an exemplary embodiment of the invention may allow for reliably and effectively draining fluid 26 out of a housing 8 of an exterior aircraft light 1, irrespective of the orientation in which the exterior aircraft light 1 is mounted to the aircraft 100.

In the embodiment depicted in FIGS. 3 and 4, the drainage tubes 14a, 14b and the discharge tube 17 extend in a common plane, which corresponds to the drawing plane of FIGS. 3 and 4. Different geometries of the draining device 12, in particular geometries in which the drainage tubes 14a, 14b and the discharge tube 17 do not extend in a common plane, are possible as well.

In the embodiment depicted in FIGS. 3 and 4, the drainage tubes 14a, 14b are oriented at an angle α of 180° with respect to each other and at an angle β of 90° with respect to the discharge tube 17. This corresponds to the two different orientations in which the exterior aircraft light 1 may be mounted to the aircraft 100, as it is depicted in FIGS. 2 to 4.

Depending on the potential orientations, in which the exterior aircraft light 1 may be mounted to the aircraft 100, the drainage tubes 14a, 14b and the discharge tube 17 may be oriented differently with respect to each other.

The drainage tubes 14a, 14b may in particular be oriented at angles α of between 15° and 180° with respect to each other.

The drainage tubes 14a, 14b may for example be arranged at an angle α of between 30° and 60° with respect to each other, in particular when the exterior aircraft light 1 is an exterior aircraft headlight, which may be mounted to an aircraft 100 in at least two different configurations, in which the orientations of the exterior aircraft headlight differ by an angle of between 30° and 60°.

The drainage tubes 14a, 14b may, for example, be arranged at an angle α of between 150° and 180° with respect to each other, in particular when the exterior aircraft light 1 is a fuselage-mounted red-flashing beacon light 120a, 120b or a wing-tip-mounted navigation light 106, which may be mounted to an aircraft 100 in at least two different configurations, in which the orientations of the red-flashing beacon light 120a, 120b or the orientations of the navigation light 106 differ by an angle of between 150° and 180°.

The drainage tubes 14a, 14b may in particular be arranged at an angle of 15°, or at an angle of 30°, or at an angle of 45°, or at an angle of 60°, or at an angle of 75°, or at an angle of 90°, or at an angle of 180° with respect to each other.

In case the exterior aircraft light 1 may be mounted to the aircraft 100 in more than two different orientations, the draining device 12 may comprises more than two drainage tubes 14a, 14b.

The drainage tubes 14a, 14b may, for example, extend radially from the central portion 13 of the draining device 12, thereby forming a star-type arrangement.

Depending on the geometry of the housing 8, in which the draining device 12 is employed, all drainage tubes 14a, 14b may have the same lengths La, Lb. It is also possible that the drainage tubes 14a, 14b have different lengths La, Lb.

The orientations and lengths La, Lb of the drainage tubes 14a, 14b may in particular be set so that in every orientation, in which the exterior aircraft light 1 may be mounted to the aircraft 100, one of the drainage tubes 14a, 14b extends towards the lowest portion of the interior space 9 for receiving fluid 26, in particular condensing water, collected at said lowest portion of the interior space 9. The respective drainage tube 14a, 14b may in particular extend substantially vertically towards the lowest portion of the interior space 9.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
a housing defining an interior space;
a light output generation unit comprising at least one light source;
power supply electronics, coupled to the light output generation unit for driving a light output of the exterior aircraft light;
wherein at least one of the light output generation unit and the power supply electronics is arranged within the interior space; and
a draining device for draining the interior space,
the draining device comprising:
a first drainage tube for receiving fluid, which is to be drained from the interior space;
a second drainage tube for receiving fluid, which is to be drained from the interior space; and
a fluid discharge port for discharging fluid out of the housing, wherein the fluid discharge port is in fluid communication with the first drainage tube and with the second drainage tube;
wherein each of the first drainage tube and the second drainage tube comprises a valve mechanism for selectively sealing and opening the respective drainage tube with respect to the interior space, each valve mechanism comprising:
a valve portion of the respective drainage tube;
a sealing element, in particular a sealing ball, wherein the sealing element is arranged in the valve portion of the respective drainage tube;
wherein the valve portion of the respective drainage tube is made of a first material and wherein the sealing element is made of a second material;
wherein the first material and the second material have different water absorption and expansion characteristics; and
wherein the valve portion and the sealing element are sized to open the valve mechanism, when immersed in fluid, which is to be drained from the interior space, and to seal the valve mechanism in an air-tight manner, when not immersed in fluid, which is to be drained from the interior space.

2. The exterior aircraft light according to claim 1, wherein the first drainage tube is arranged for receiving fluid from a first portion of the housing and wherein the second drainage tube is arranged for receiving fluid from a second portion of the housing.

3. The exterior aircraft light according claim 1, wherein the first drainage tube and the second drainage tube are oriented at an angle (α) of between 15° and 180° with respect to each other, wherein the first drainage tube and the second drainage tube are in particular arranged at an angle (α) of between 30° and 60° with respect to each other or at an angle (α) of between 150° and 180° with respect to each other.

4. The exterior aircraft light according to claim 1, wherein the valve portion comprises a retainer structure, the retainer structure preventing the sealing element from dropping out of the valve portion, when the valve mechanism is immersed in fluid, which is to be drained from the interior space.

5. The exterior aircraft light according to claim 1, wherein the valve mechanism is arranged at an end portion of the respective drainage tube.

6. The exterior aircraft light according to claim 1, wherein each of the first drainage tube and the second drainage tube has an opening and wherein said opening is arranged in close proximity to a respective wall portion of a surrounding wall structure around the interior space, wherein the opening is in particular spaced from the respective wall portion by between 0.5 mm and 5, more in particular by between 1 mm and 2.5 mm.

7. The exterior aircraft light according to claim 1, wherein each of the first drainage tube and the second drainage tube, when not immersed in fluid, has an inner diameter (di) in the range of between 5 mm and 15 mm, in particular an inner diameter (di) in the range of between 8 mm and 12 mm, more particularly an inner diameter (di) of about 10 mm.

8. The exterior aircraft light according to claim 1,
wherein, when the first and second materials are not immersed in fluid, the sealing element has an outer diameter (da) that is between 0.03 mm and 0.08 mm larger, in particular about 0.05 mm larger, than an inner diameter (di) of the valve portion; and/or
wherein, when the first and second materials are immersed in fluid (26), the sealing element has an outer diameter (da) that is between 0.1 mm and 0.5 mm smaller, in particular about 0.3 mm smaller, than an inner diameter (di) of the valve portion.

9. The exterior aircraft light according to claim 1,
wherein the first material includes at least one of PA6, PA 6.6, PA 66 and PA 46, and/or
wherein the second material includes at least one of PMMA, PEEK, PTFE and steel.

10. The exterior aircraft light according to claim 1, wherein the fluid discharge port comprises a discharge tube, wherein the discharge tube is in particular oriented substantially orthogonal to the first drainage tube and/or to the second drainage tube.

11. The exterior aircraft light according to claim 1,
wherein the exterior aircraft light is mountable to an aircraft in a first mounting orientation and in a second mounting orientation,
wherein the first drainage tube extends into a first portion of the interior space, wherein the first portion is a low portion of the interior space, when the exterior aircraft light is in the first mounting orientation, and
wherein the second drainage tube extends into a second portion of the interior space, wherein the second portion is a low portion of the interior space, when the exterior aircraft light is in the second mounting orientation.

12. The exterior aircraft light according to claim 1,
wherein the light output generation unit and the power supply electronics are arranged in the housing; or
wherein the power supply electronics are arranged in the housing and the light output generation unit is arranged in a separate light head portion of the exterior aircraft light, which is arranged outside of the housing.

13. The exterior aircraft light according to claim 1,
wherein the exterior aircraft light is an aircraft headlight, such as an aircraft landing light or an aircraft take-off light or an aircraft taxi light or an aircraft runway turn-off light or a multi-functional aircraft headlight, which combines the functionalities of at least two of an aircraft landing light, an aircraft take-off light, an aircraft taxi light, and an aircraft runway turn-off light; or
wherein the exterior aircraft light is an aircraft navigation light, in particular a wing-tip-mounted aircraft navigation light; or
wherein the exterior aircraft light is a red-flashing aircraft beacon light, in particular a fuselage-mounted red-flashing aircraft beacon light.

14. An aircraft, such as an airplane or a helicopter, comprising at least one exterior aircraft light according to claim 1.

15. A method of draining a fluid out of the interior space of the housing of an exterior aircraft light according to claim 1, with the exterior aircraft light being mounted to an aircraft in a first mounting orientation, wherein the first drainage tube extends into a low portion of the interior space in the first mounting orientation, the method comprising the steps of:
with fluid gathered in the low portion of the interior space of the housing, when the aircraft is on the ground, opening the valve mechanism of the first drainage tube;
taking off the aircraft and gaining altitude;
with a pressure difference between the interior space of the housing and an outside environment of the aircraft, driving the fluid through the valve mechanism of the first drainage tube and out of the housing.

* * * * *